US006903925B2

(12) United States Patent
Lee

(10) Patent No.: US 6,903,925 B2
(45) Date of Patent: Jun. 7, 2005

(54) KEYSWITCH FOR KEYBOARD OF NOTEBOOK COMPUTER

(75) Inventor: Tong-Hsueh Lee, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/265,246

(22) Filed: Oct. 7, 2002

(65) Prior Publication Data

US 2004/0008473 A1 Jan. 15, 2004

(30) Foreign Application Priority Data

Jul. 12, 2002 (TW) .................................... 91210653 U

(51) Int. Cl.[7] .............................................. G06F 1/16

(52) U.S. Cl. ...................................... 361/680; 361/686

(58) Field of Search ................................ 361/680, 686

(56) References Cited

U.S. PATENT DOCUMENTS 5,590,020 A * 12/1996 Sellers ...................... 361/680

* cited by examiner

*Primary Examiner*—Yean-Hsi Chang
(74) *Attorney, Agent, or Firm*—Birch Stewart Kolasch & Birch, LLP

(57) ABSTRACT

A keyswitch for keyboard of notebook computer comprises a keycap; a base arranged below the keycap and having two protuberances thereon; and a lever mechanism. The lever mechanism has a plurality of top ends connected to the keycap and a plurality of lower ends connected to the base. The lever mechanism has two projections located on lower lateral edges thereof and corresponding to the protuberances. During a downward stroke of the keycap, the projections of the lever mechanism will be in contact with the protuberances, whereby the stability of the keyswitch will be enhanced.

5 Claims, 6 Drawing Sheets

KEYSWITCH FOR KEYBOARD OF NOTEBOOK COMPUTER

This nonprovisional application claims priority under 35 U.S.C. § 119(a) on patent application No. 91210653 filed in TAIWAN on Jul. 12, 2002, which is herein incorporated by reference.

FIELD OF THE INVENTION

The present invention relates to a keyswitch for keyboard of notebook computer, especially to a keyswitch with lever mechanism for keyboard of notebook computer.

BACKGROUND OF THE INVENTION

Conventional keyswitches with lever mechanism (scissors type keyswitch) are extensively used in keyboard for notebook computer. FIG. 1 shows a conventional keyswitch with a keycap 10*a*, a first lever 11*a*, a second lever 12*a* and a base 13*a*, wherein the first lever 11*a* and the second lever 12*a* are cross to each other. The first lever 11*a* has a pivotal shaft 14*a* pivotally connected to a pivotal stage 16*a* on the base 13*a* and the second lever 12*a* has a pivotal shaft 15*a* pivotally connected to a pivotal stage 17*a* on the base 13*a*, respectively. Each of the first lever 11*a* and the second lever 12 has a top end connected to a bottom face of the keycap 10*a*, whereby the first lever 11*a* and the second lever 12 form a lever mechanism.

The first lever 11*a* of the lever mechanism has a bump 18*a* placed at a lower center end thereof and the base 13*a* has a flange 19*a* on top face thereof and corresponding to the bump 18*a*. The bump 18*a* is in contact with and clamped by the flange 19*a* during downward stroke of the keycap 10*a*.

A rubber dome (not shown) is placed between the keycap 10*a* and the base 13*a*. When the keycap 10*a* is guided by the lever mechanism for vertical up and down movement, the rubber dome below the keycap 10*a* will detach from or touch a flexible circuit board (not shown) on the base 13*a* and a switch on the flexible circuit board is turned off or on.

However, the conventional keyswitch for notebook computer has the problem of rotation and shaking. The keyswitches with lever mechanism have limitation of further improvement.

SUMMARY OF THE INVENTION

It is an object of the present invention to provide a keyswitch for keyboard of notebook computer and having enhanced stability during the key pressing stroke.

To achieve above object, the present invention provides a keyswitch for keyboard of notebook computer comprising a keycap; a base arranged below the keycap and having two protuberances thereon; and a lever mechanism. The lever mechanism has a plurality of top ends connected to the keycap and a plurality of lower ends connected to the base. The lever mechanism has two projections located on lower lateral edges thereof and corresponding to the protuberances. During a downward stroke of the keycap, the projections of the lever mechanism will be in contact with the protuberances, whereby the stability of the keyswitch will be enhanced.

The various objects and advantages of the present invention will be more readily understood from the following detailed description when read in conjunction with the appended drawing, in which:

DETAILED DESCRIPTION OF THE INVENTION

Figure 1:
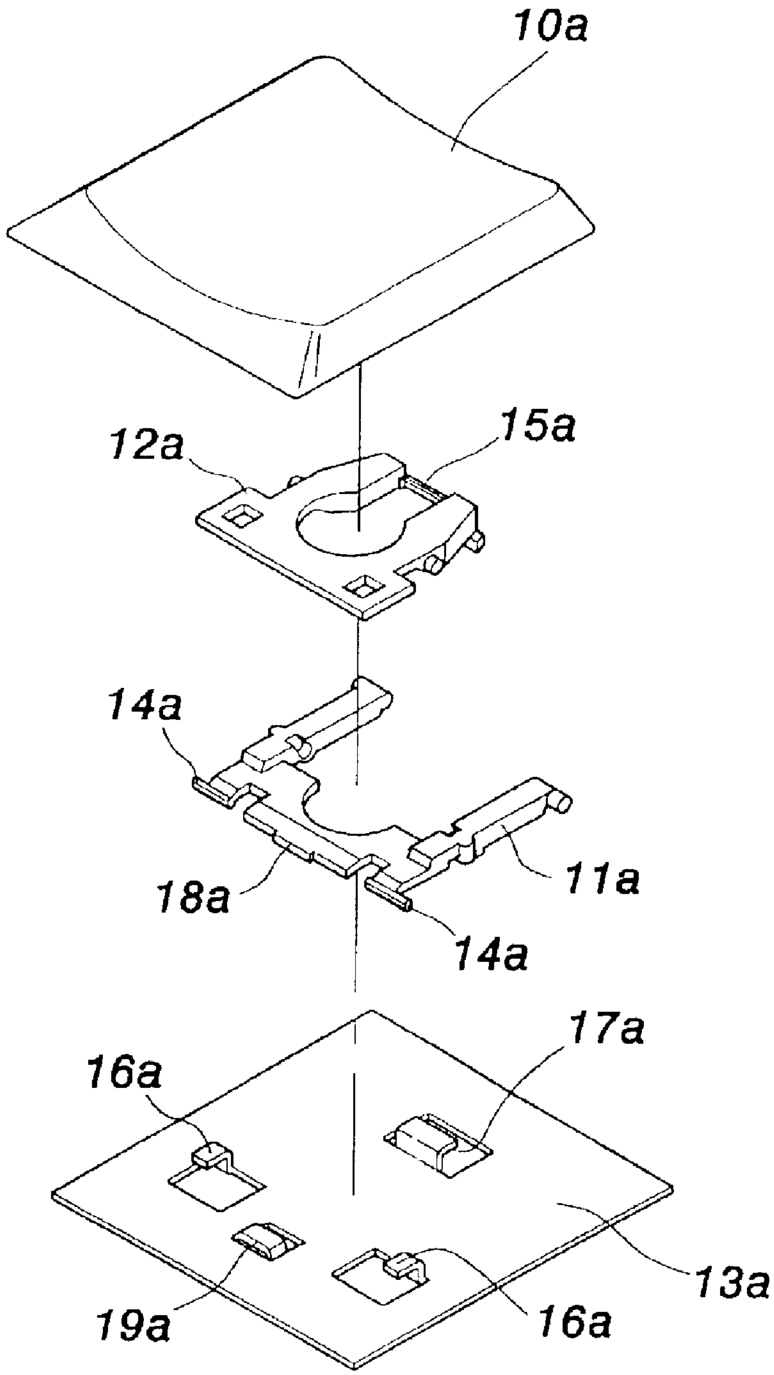
FIG. 1 PRIOR ART
FIG. 1 shows an exploded view of a conventional keyswitch for keyboard of notebook computer.
Figure 2:
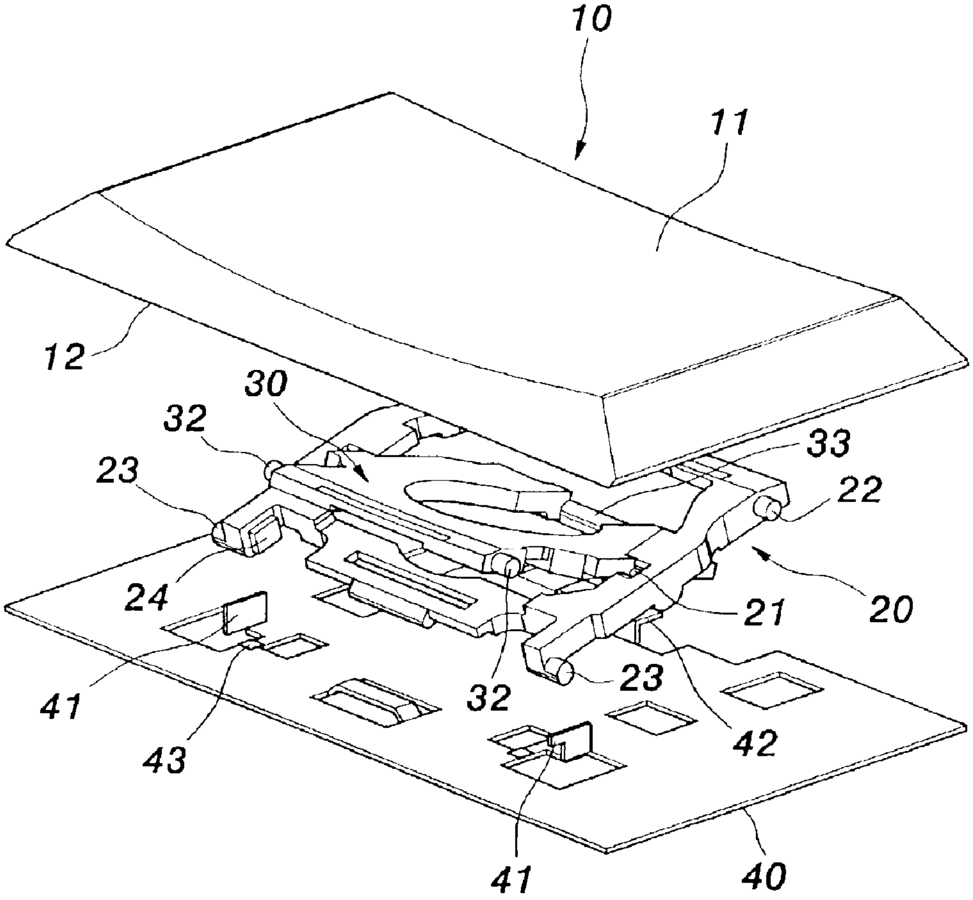
FIG. 2 shows an exploded view of a keyswitch for keyboard of notebook computer according to the present invention.
Figure 3:
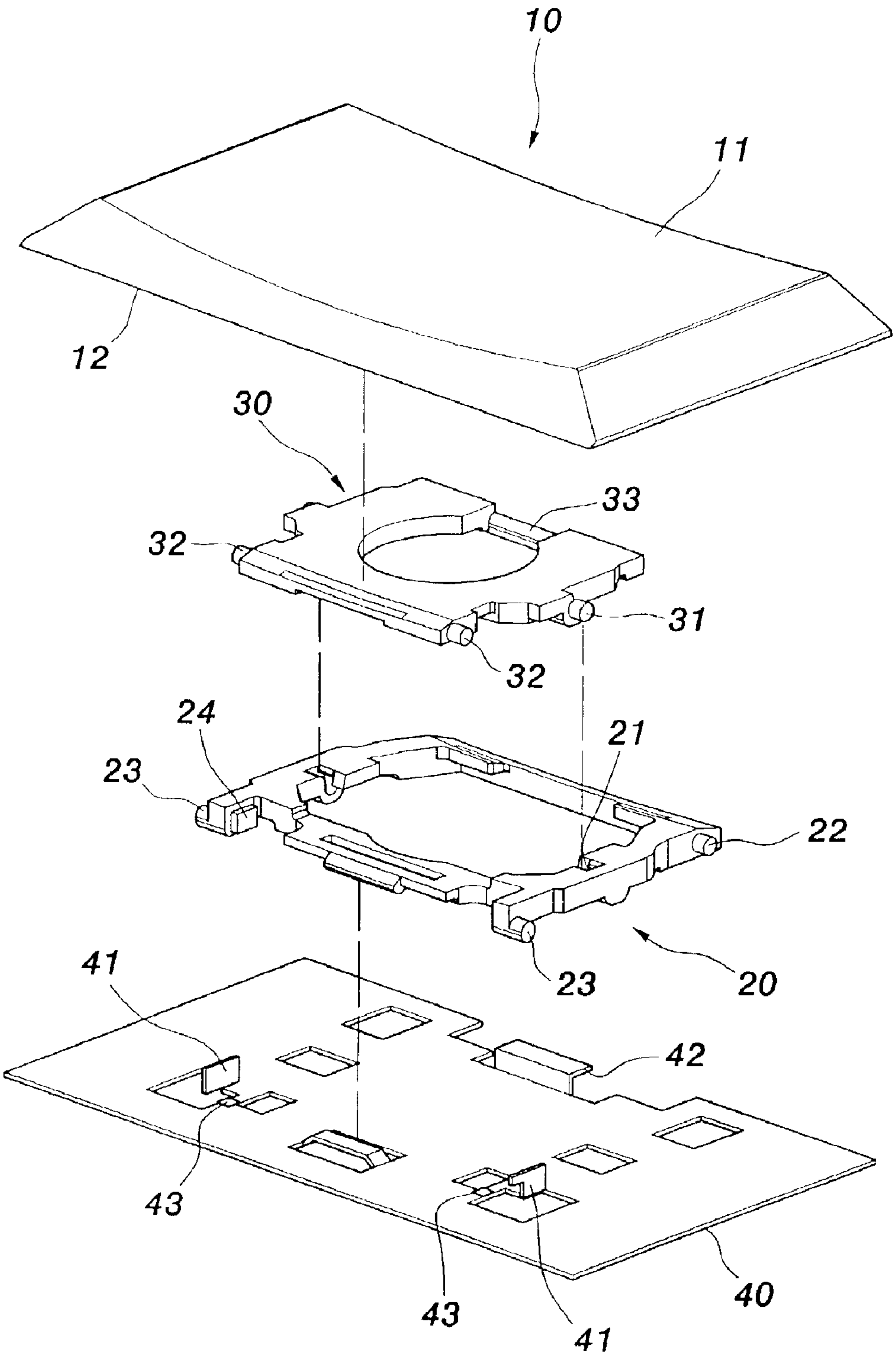
FIG. 3 shows another exploded view of a keyswitch for keyboard of notebook computer according to the present invention.
Figure 4:
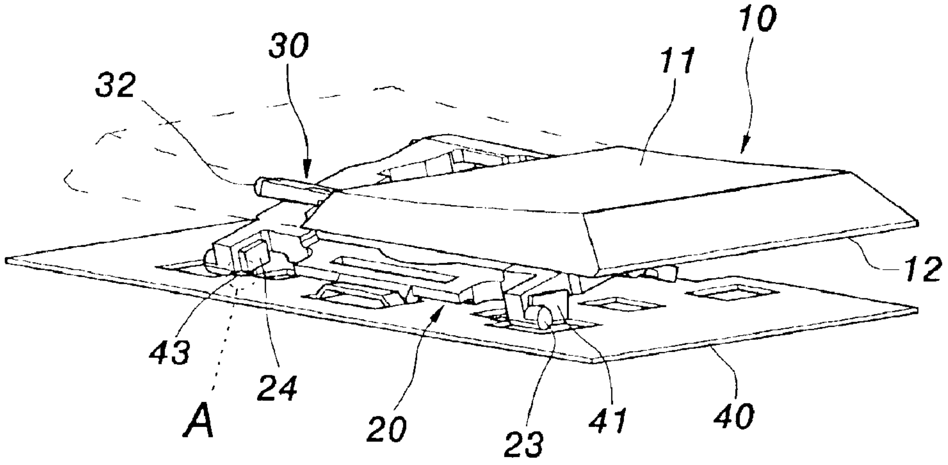
FIG. 4 shows a perspective view of a keyswitch for keyboard of notebook computer according to the present invention.

With reference to FIGS. 2 to 4, the present invention provides a keyswitch for keyboard of notebook computer and the keyswitch comprises a keycap 10, a first lever 20, a second lever 30 and a base 40. The keycap 10 is of rectangular shape and having an operative face 11 and an assembling face 12.

The first lever 20 and the second lever 30 are placed between the assembling face 12 of the keycap 10 and the base 40. The first lever 20 has a plurality of pivotal openings 21 and the second lever 30 has corresponding pivotal shafts 31 such that the first lever 20 and the second lever 30 can be assembled to form lever mechanism.

The first lever 20 has two first connection shafts 22 on two lateral upper edges thereof and the second lever 30 has two second connection shafts 32 on two lateral upper edges thereof. The first lever 20 and the second lever 30 are assembled to the assembling face 12 by the first connection shafts 22 and the second connection shafts 32, respectively. Therefore, the first lever 20 and the second lever 30 are assembled to the keycap 10 on top ends thereof.

The first lever 20 has two first pivotal shafts 23 on two lateral lower edges thereof and the second lever 30 has two second pivotal shafts 33 on two lateral lower edges thereof. The first lever 20 and the second lever 30 are assembled to the base 40 by the first pivotal shafts 23 and the second pivotal shafts 33, respectively.

The base 40 is made of metal plate and arranged below the keycap 10, the first lever 20, and the second lever 30. The base 40 has first pivotal stages 41 and second pivotal stages 42 corresponding to the first pivotal shafts 23 and the second pivotal shafts 33. The first pivotal shafts 23 and the second pivotal shafts 33 are pivotally connected to the first pivotal stages 41 and second pivotal stages 42 such that the first lever 20 and the second lever 30 are assembled to the base 40 on lower ends thereof.

The keycap 10 has rubber dome (not shown) and flexible circuit board (not shown) therebelow. When the keycap 10 is guided by the lever mechanism for vertical up and down movement, the rubber dome below the keycap 10 will detach from or touch the flexible circuit board and a switch (not shown) on the flexible circuit board is turned off or on.

Figure 5:
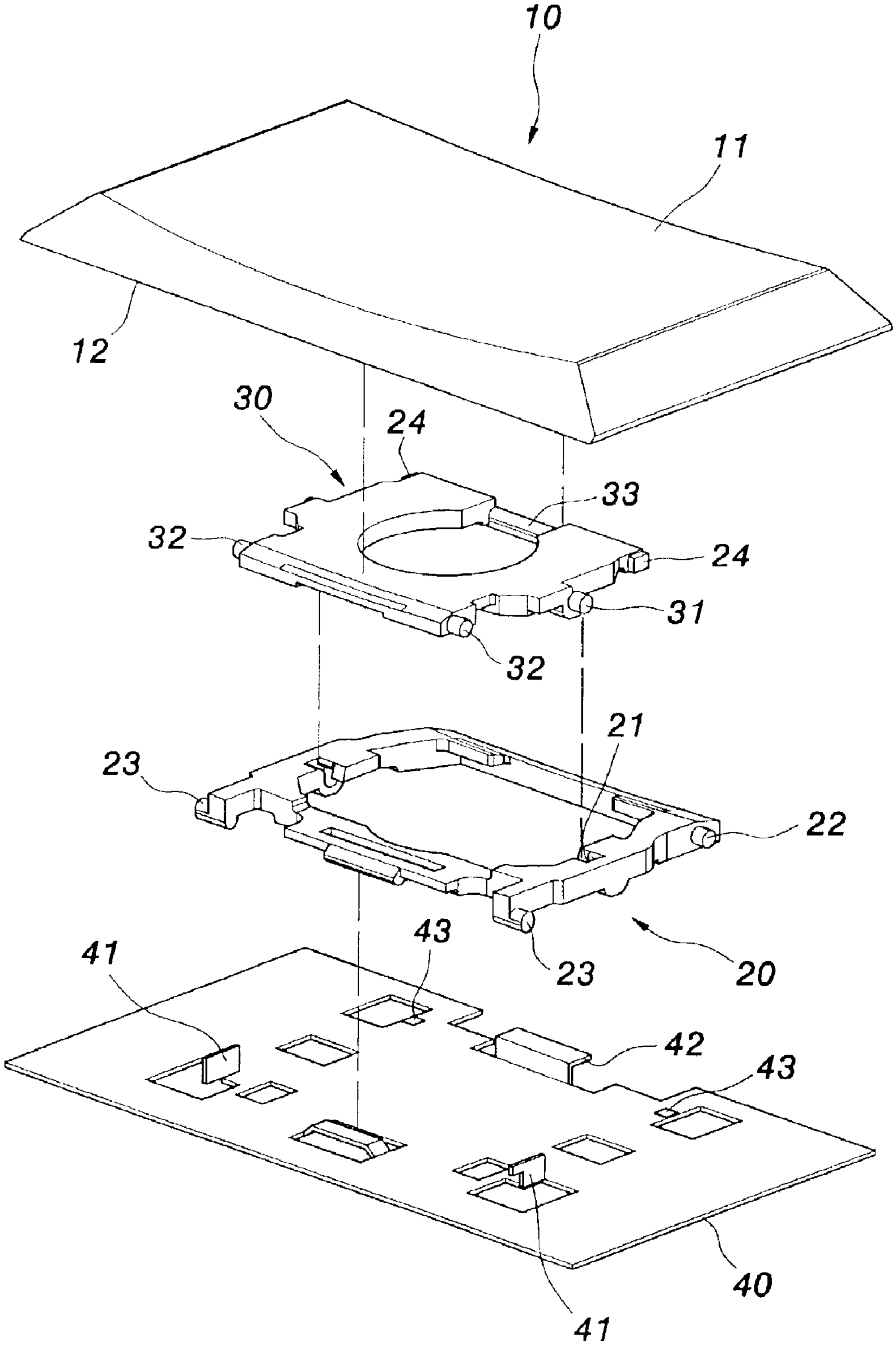
FIG. 5 shows an exploded view of a keyswitch for keyboard of notebook computer according to another preferred embodiment of the present invention.
Figure 6:
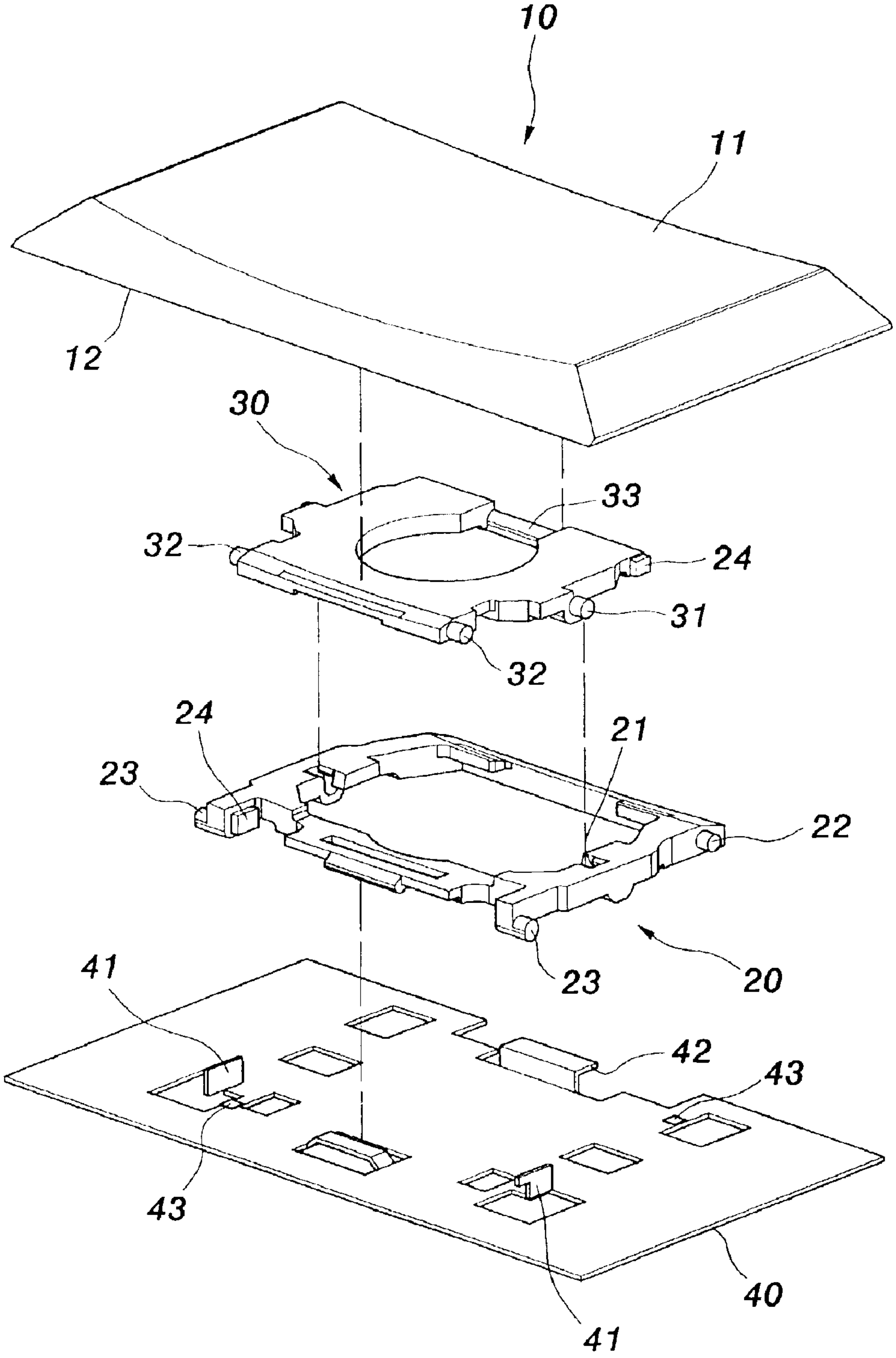
FIG. 6 shows an exploded view of a keyswitch for keyboard of notebook computer according to still another preferred embodiment of the present invention.

In the present invention, the first lever 20 has two projections 24 thereon and formed in one piece form with the first lever 20. The projection 24 has arbitrary shape such as rectangular shape. The two projections 24 can be formed on two lateral lower edges of the first lever 20. For example, the two projections 24 can be formed on inner faces or outer faces of two lateral lower edges of the first lever 20. In the preferred embodiment shown in FIG. 3, the two projections 24 are formed on the first lever 20. Moreover, as shown in FIG. 5, the two projections 24 can also be formed on the second lever 30. Alternatively, the projections 24 can also be formed both on the first lever 20 and the second lever 30. The two projections 24 can be faced to each other or staggered to each other, alternatively, arranged diagonally as shown in FIG. 6. Moreover, the number of the projections 24 can be increased to three or four, depending on practical situation.

Moreover, the base 40 has two protuberances 43 projecting out of the top face of the base 40 and placed corresponding to the projections 24. The two protuberances 43 are formed in one piece form with the base 40. The protuberances 43 can have arbitrary shapes such as rectangular or circular shapes. The two protuberances 43 are located at predetermined locations on inner side of each first pivotal stage 41 and having predetermined separation with the first pivotal stage 41. The positions of the protuberances 43 may be changed with the positions of the projections 24. T he two protuberances 43 can be faced to each other or staggered to each other, alternatively, arranged diagonally. Moreover, the number of the protuberances 43 can be increased to three or four, depending on practical situation.

Figure 4A:
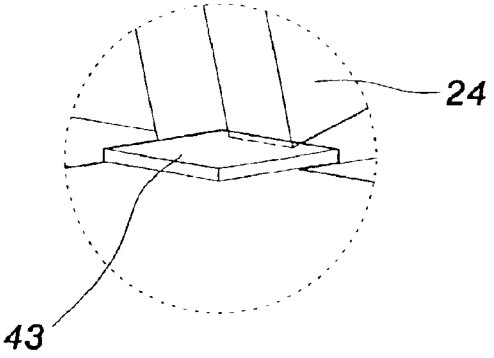
FIG. 4A shows a partially enlarged view of part A in FIG. 4.

With reference now to FIG. 4A, during the downward stroke of the keycap 10, the projections 24 on the first lever 20 of the lever mechanism will be in contact with the protuberances 43 and positioned by the protuberances 43. The stability of the keyswitch during key pressing operation is enhanced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A keyswitch for keyboard of notebook computer, comprising a keycap;

a base arranged below the keycap and having two protuberances thereon and a pivotal stage; and a lever mechanism having a plurality of top ends connected to the keycap and a plurality of lower ends connected to the base, the lever mechanism having two projections located on lower lateral edges thereof and corresponding to the protuberances which are separated from the pivotal stage on the base;

wherein during a downward stroke of the keycap, the projections of the lever mechanism will come into contact with the protuberances and be positioned thereby to enhance the stability of the keyswitch.

2. The keyswitch for keyboard of notebook computer as in claim 1, wherein the lever mechanism comprises a first lever and a second lever in cross arrangement with the first lever.

3. The keyswitch for keyboard of notebook computer as in claim 2, wherein the two projections are located on at least one of the first lever and the second lever.

4. The keyswitch for keyboard of notebook computer as in claim 1, wherein the two projections are located on at least one of an inner face and an outer face of lever mechanism.

5. The keyswitch for keyboard of notebook computer as in claim 1, wherein at least one additional protuberance is provided and additional projection with number corresponding to the additional protuberance is also provided.

* * * * *